UNITED STATES PATENT OFFICE 2,413,815

GELATIN PREPARATION

Albert A. Epstein, Carmel, N. Y.

No Drawing. Application January 10, 1941,
Serial No. 373,943

6 Claims. (Cl. 99—18)

In its general aspect, my invention relates to a treatment for placing gelatin in solution and coordinately to the product resulting from such treatment. In a more particular aspect my invention relates to gelatin in a form conveniently usable for nutritional purposes.

Gelatin is of the class of colloids which when placed in solution, is subject to the reversal action generally termed gelation. This phenomenon is an undesired one in many of the uses to which gelatin is put. For example, where gelatin is taken as a food, it is the present practice to place a measured quantity of comminuted gelatin in solution in a fluid which, however, must be imbibed quickly and before the reversal, i. e. gelation, occurs. This is one of the reasons why its use is discontinued so frequently after a short trial.

One of the important objects of my invention is the production of gelatin in such form as to overcome and eliminate this aforementioned shortcoming. This object I attain generally by so treating the gelatin in the presence of a solvent that the reversal action (gelation) is entirely inhibited so that there results a gelatin product which, even at relatively high concentrations, remains permanently fluid, i. e., fluid at all temperatures to the very point where the fluid solvent congeals. My process and my product are to be distinguished from gelatin solutions whose gelation characteristics have been modified by agents such as tartaric or citric acid and whose effect is merely to retard the point, as to temperature or time, at which gelation occurs or the time required for its completion. Gelation ultimately, however, is effected, indicating that the gelatin is not in a form which is permanently fluid.

The aforementioned manner of using gelatin for nutritional purposes is attended with the further handicap that the maximum amount of gelatin that can be conveniently placed in solution is approximately only 2% of the solvent, so that an increased amount of the solvent fluid must be imbibed in order to get even a minimum dose of gelatin.

It is therefore a further object of my invention to so treat gelatin in the presence of a solvent that the gelatin concentration can be increased.

Gelation is a phenomenon about which little is known beyond the results of actual experience. Ordinarily predictions can be based upon experience under the assumption of the law of uniformity of behaviour. Such does not appear to be the case with gelation. No predictions made thereof under conditions differing in a material respect from those of actual experience, can be accepted unless proven. Therefore, any change in the factors which determine or control gelation in a material respect from actual experience may produce a result which is entirely unexpected and unpredictable.

My product is to be distinguished from substances vaguely denominated as "metagelatins" in these and many other respects as will hereinafter appear.

As one aspect of my invention relates to a form of gelatin which is permanently fluid, its employment for nutritional purposes requires the concomitant characteristic that the fluid form be permanently chemically stable. It is therefore a further object of my invention to so treat gelatin that not only is it in a form which is permanently or fixedly fluid, but also permanently and fixedly chemically stable, and this object I also attain by the treatment which I will shortly describe, first in general terms and then later on in more detail.

So also from the nutritional aspect it is desirable if not necessary that the form which the gelatin takes when it is to be employed for nutritional purposes shall be palatable as well as potable, because otherwise this nutritional aspect of my invention will be defeated. It is therefore a still further object of my invention to produce a permanently fluid form of gelatin which has these desired characteristics.

Since in the treatment which I refer to, the pH value of the solution governs its palatability characteristic and also its characteristic of permanent chemical stability, it is a further object of my invention to provide a treatment for gelatin in the presence of a solvent whereby the pH for the first of these characteristics is approximately the same as that for the second-mentioned characteristic, so that one and the same fluid can have both characteristics at the same pH, and therefore the ideal is created which is a more specific object of my invention.

The treatment whereby I attain my objectives, broadly stated, is as follows:

Phosphoric acid, $H_3PO_4$, is added to a solution of gelatin in a quantity sufficient to bring its acidity to a pH of less than 5.7 and the whole is heated to boiling in an acid and heat resisting tank until precipitation, indicated by cloudiness, occurs. The solution is boiled for some time, and then, while it is still hot, neutralization by means of calcium carbonate is begun and continued until the pH of the mixture is substantially within the range of not more than 5.9 and not less than 5.7. If a pH of 5.9 should be exceeded, phosphoric acid is again added to restore the pH to within the range.

The precipitated calcium phosphate is removed, as by filtration or centrifuging.

I have found that the concentration of gelatin may be well in excess of 20% without in any way affecting the fixed liquidity characteristics of the solution.

The product which I attain by the foregoing treatment has these characteristics.

It is potable, that is, it can be taken into the system without harmful effects, such as corrosion of the tissues; it is nutritious; and it is palatable, even without the addition of flavoring matter. It will remain fluid at all temperatures above the congealing point of the solvent, even for gelatin concentrations well in excess of twenty percent of the solvent. Lastly, it is chemically stable.

The general objects of my invention are: a manner of treatment of gelatin to arrive at a form which is permanently fluid; a manner of treatment of gelatin for nutritional purposes to arrive at a form thereof which is not only permanently fluid, but also fixedly chemically stable and palatable as well as potable; a manner of treatment of gelatin to produce a product which is permanently fluid and which has the characteristic that chemical stability, potability and palatability all are attained at approximately the same pH.

By way of example I now give the details of the actual preparation of a solution containing gelatin to water in the proportion of twelve percent and having the desired characteristics.

120 grams of gelatin are soaked in 1,000 cc. of water and heated in a hot water bath until dissolved. Then 15 cc. phosphoric acid (85% strength) are added and the whole heated to boiling in an acid and heat resisting tank (glass lining) until heavy precipitation (cloudiness) occurs. The solution is boiled for another 15 minutes and then neutralization begun while the solution is still hot. Twenty to 30 grams of calcium carbonate is added slowly particularly at the beginning when the foaming is very heavy. This is continued until a pH of 5.7 to 5.9 is reached. The entire mixture is allowed to cool and the precipitate to settle. The entire mixture is then passed through a filter to remove the sediment. The reason for the neutralization at the high temperature is that there is less tendency for the formation of calcium biphosphate which is slightly soluble in water.

For gelatin solutions of different concentration the procedure would be substantially the same. However, where the proportion of gelatin is high, as in a 25% solution, filtration offers difficulties, and the precipitated calcium phosphate is conveniently removed by centrifuging.

My gelatin solution or fluid gelatin as I may term it, can be packaged in fluid containers such as bottles and may be imbibed undiluted or mixed with some other drink.

The fluid gelatin is colorless and substantially without taste and its presence hardly noticeable if at all.

It will be understood that the process herein given is by way of exemplification as to many of its details, and that therefore as to these details the specifications of my process may be varied without departing from my invention.

Having thus described my invention and illustrated its use, what I now claim as new and desire to secure by Letters Patent, is:

1. The process of producing a palatable, potable, chemically-stable and gelatin-containing food product which remains fixedly fluid at all temperatures down to its congealing point, said process comprising the step of boiling a gelatin hydrosol which is normally subject to gelation, in the presence of phosphoric acid and retaining sufficient phosphoric acid to reduce the pH of the fluid food product to 5.9 or less.

2. The process of producing a palatable, potable, chemically-stable and gelatin-containing food product which remains fixedly fluid at all temperatures down to its congealing point, said process comprising the step of boiling a gelatin hydrosol which is normally subject to gelation, in the presence of phosphoric acid and retaining sufficient phosphoric acid to reduce the pH of the fluid food product to between 5.9 and 5.7.

3. The process of producing a palatable, potable, chemically-stable and gelatin-containing food product which remains fixedly fluid at all temperatures down to its congealing point, said process comprising the steps of adding phosphoric acid to a gelatin hydrosol which is normally subject to gelation, boiling the solution until heavy precipitation occurs, continuing the boiling for a short period thereafter, then bringing the solution to a pH of 5.9 or less while the solution remains at a high temperature.

4. The process of producing a palatable, potable, chemically-stable and gelatin-containing food product which remains fixedly fluid at all temperatures down to its congealing point, said process comprising the step of adding phosphoric acid to a gelatin hydrosol which is normally subject to gelation, boiling the solution until heavy precipitation occurs and continuing the boiling for a short period thereafter, then bringing the solution to a pH of between 5.9 and 5.7 while the solution remains at a high temperature.

5. A palatable, potable and chemically-stable fluid food product which remains fluid at all temperatures above its freezing temperature, said food product containing gelatin and phosphoric acid, and having an acidity corresponding to a pH value of the order of between 5.7 and 5.9.

6. A potable, palatable and chemically-stable non-gelling solution containing gelatin in a concentration of no less than 12 per cent and phosphoric acid in a sufficient amount to give the solution a pH value of the order of between 5.9 and 5.7.

ALBERT A. EPSTEIN.